United States Patent
Martin et al.

(10) Patent No.: US 11,179,616 B2
(45) Date of Patent: Nov. 23, 2021

(54) TRAINING ACCESSORIES AND METHODS FOR IMPROVING ATHLETIC TECHNIQUES

(71) Applicant: Reaction Technologies, Ann Arbor, MI (US)

(72) Inventors: Brandon Martin, Ann Arbor, MI (US); Marcus Graham, Ann Arbor, MI (US)

(73) Assignee: Reaction Technologies, Ann Arbor, MI (US)

( * ) Notice: Subject to any disclaimer, the term of this patent is extended or adjusted under 35 U.S.C. 154(b) by 484 days.

(21) Appl. No.: 15/966,740

(22) Filed: Apr. 30, 2018

(65) Prior Publication Data

US 2018/0311563 A1  Nov. 1, 2018

Related U.S. Application Data

(60) Provisional application No. 62/492,582, filed on May 1, 2017.

(51) Int. Cl.
*A63B 71/06* (2006.01)
*A63B 24/00* (2006.01)
*G06K 9/00* (2006.01)
*A63B 69/34* (2006.01)

(52) U.S. Cl.
CPC ...... *A63B 71/0619* (2013.01); *A63B 24/0087* (2013.01); *G06K 9/00342* (2013.01); *G06K 9/00496* (2013.01); *A63B 69/345* (2013.01); *A63B 2071/0658* (2013.01); *A63B 2225/50* (2013.01); *A63B 2225/685* (2013.01)

(58) Field of Classification Search
CPC .................................................. A63B 71/0619
USPC ........................................................ 434/251
See application file for complete search history.

(56) References Cited

U.S. PATENT DOCUMENTS

2013/0266918 A1* 10/2013 Tinjust .................. G09B 19/00
434/247

* cited by examiner

*Primary Examiner* — Thomas J Hong
(74) *Attorney, Agent, or Firm* — Casimir Jones, S.C.; Tanya A. Arenson (57) ABSTRACT

Training accessories and methods for improving athletic techniques, such as, for example, tackling form for football. A display can be coupled to a piece of athletic equipment, such as a tackling dummy, and the display depicts a symbol at a time at which a player is or is about to interact with the equipment or perform a movement or action. An input is provided of the player's identification of the depicted symbol and compared to the symbol that was actually depicted. The player's correct identification of the depicted symbol can indicate that the player performed the movement or action, or the interaction with the equipment, with appropriate form. A player's failure to correctly identify the depicted symbol can indicate to a coach that the player may need further instruction on proper technique or form with which the movement or action, or the interaction with the equipment, should be performed.

6 Claims, 6 Drawing Sheets

TRAINING ACCESSORIES AND METHODS FOR IMPROVING ATHLETIC TECHNIQUES

CROSS-REFERENCE TO RELATED APPLICATION

This application claims priority to United States Provisional Patent Application No. 62/492,582, filed May 1, 2017, the entire contents of which application are incorporated by reference in their entirety.

FIELD OF INVENTION

The present invention relates generally to athletic training; and more particularly, but not by way of limitation, to training accessories and methods for improving athletic techniques, such as, for example, tackling form for football.

BACKGROUND

In various sports, improper or deficient techniques or form can reduce athletic performance and/or increase the likelihood of injury. By way of example, many, if not most, head or neck injuries in football occur when a running, tackling, or blocking player initiates contact or "leads" with the crown of their helmet, for example via head-to-head contact with another player. As such, when tackling or blocking in football, it is considered by many to be critical to player safety for the tackling or blocking player to keep his or her head up; if instead the tackling or blocking player's head is lowered upon impact with the tackled or blocked player, the tackling or blocking player's neck and/or spine can be injured. In extreme, but not-necessarily-uncommon instances, the tackling or blocking player's spine can be partially severed, resulting in paralysis, such as paraplegia or quadriplegia, and/or death. In other sports, it can also be important for players to keep their heads up to avoid injuries or to simply improve performance. For example, a soccer player may have a higher likelihood of making a goal if his or her gaze is upward and looking at the goal rather than down at the ball. And a boxer may be at greater risk of being open to counterpunches if his or her head/gaze lowers when punching. Likewise, a basketball player may be at greater risk of having the ball stolen if his or her head/gaze lowers when dribbling.

SUMMARY

This disclosure includes embodiments of systems and methods, such as, for example, to improve a player's athletic technique and/or form. A display can be coupled to a piece of athletic equipment (e.g., a tackling dummy) or a person (e.g., a human torso), and the display used to depict a symbol (e.g., a number, a letter, a word or other combinations of letters and/or numbers, a picture, and/or the like) at a time at which a player is or is about to interact with the equipment or perform a movement or action. For example, when the piece of athletic equipment is a tackling dummy, the display can depict a number as or before the player is about to hit the tackling dummy. When the piece of athletic equipment is a punching bag, the display can depict a number as or before the player is about to hit the punching bag. When the piece of athletic equipment is a soccer goal, the display can depict a number as or before the player is about to kick a ball into the goal. When the piece of athletic equipment is a pole or other structure supporting a basketball hoop, the display can depict a number as or before the player dribbles the ball. In some instances, the piece of athletic equipment may not typically be used in the sport for which it is used with the present systems and methods for training; for example, the piece of athletic equipment may be a stand or support that simply supports the display, and the display can depict a number as or before a player dribbles a basketball. When the display is coupled to a person, such a coach, the display can depict a number as or before as or before a player dribbles a basketball (e.g., to encourage the player to maintain attention and situational awareness while dribbling).

Feedback is provided with the player's identification of the depicted symbol, and that feedback is compared to the symbol that was actually depicted. The player's correct identification of the depicted symbol can indicate that the player performed the movement or action, or the interaction with the equipment, with appropriate form. A player's failure to correctly identify the depicted symbol can indicate to a coach that the player may need further instruction on proper technique or form with which the movement or action, or the interaction with the equipment, should be performed. For example, if a player uses poor, head-down form when hitting a tackling dummy, the player will not be able to see the depicted symbol and therefore will not be able to correctly identify the depicted symbol, and the player's failure to correctly identify the depicted symbol can alert a coach or trainer of the need for additional instruction on proper form or technique.

Some embodiments of the present systems comprise: a piece of athletic equipment; and a display coupled to the piece of athletic equipment and configured to depict a plurality of symbols one at a time. In some embodiments, the display is coupled to the piece of athletic equipment by a strap, harness, hook-and-loop fasteners, clips, buttons, and/or adhesive.

Some embodiments of the present systems further comprise: a sensor coupled to the piece of athletic equipment (e.g., a tackling dummy) or person (e.g., a human torso) and in communication with the display. In some embodiments, the sensor comprises an accelerometer. In some embodiments, the display includes memory and a processor configured to execute instructions from the memory, the instructions configured to cause the display to: upon receipt of a signal from the sensor, transmit an indication of one of the symbols depicted by the display. In some embodiments, the display includes memory and a processor configured to execute instructions from the memory, the instructions configured to cause the display to: upon receipt of a signal from the sensor, depict a different one of the symbols that was depicted when or prior to the signal was received.

In some embodiments of the present systems, the display comprises a connection port configured to connect the display to a handheld device that is remote from the display, and the display is configured to receive an input from the handheld device to cause the display to depict one the symbols. In some embodiments, the handheld device is physically tethered to the display by a communications cable. In some embodiments, the handheld device comprises a smartphone, remote, or tablet wirelessly connected to the display, the handheld device is configured to receive a user input and transmit the user input wirelessly to the display. In some embodiments, the handheld device includes memory and a processor configured to execute instructions from the memory, the instructions configured to cause the handheld device to: prompt a user to provide a first input associated with a first player and asserted to correspond to a first one of the symbols depicted on the display. In some embodiments, the instructions are further configured to cause the handheld device to: determine whether the first input corresponds to the depicted first symbol. In some embodiments, the handheld device includes memory and a processor configured to execute instructions from the memory, the instructions configured to cause the handheld device to: prompt a user to provide a first input indicative of whether the first player correctly identified the first depicted signal after an action or interaction with the piece of athletic equipment or person. In some embodiments, the action or interaction includes hitting the piece of athletic equipment. In some embodiments, the instructions are further configured to cause the handheld device to: store a record, associated with the first player, of whether the first input corresponds to the depicted first symbol.

In some embodiments of the present systems, the instructions are further configured to cause the handheld device to: output a record, associated with the first player, of whether the first input corresponds to the depicted first symbol. Some embodiments further comprise: a server remote from the handheld device, the server including memory and a processor configured to execute instructions from the memory, the instructions configured to cause the server to: receive from the handheld device a plurality of records associated with a plurality of players; and store the received records.

Some embodiments of the present methods comprise: causing a display coupled to a piece of athletic equipment (e.g., a tackling dummy) or person (e.g., a human torso) to depict a first symbol at the time of an action by a player or an interaction by the player with the piece of athletic equipment or person; and receiving a first input associated with the first player and asserted to correspond to the depicted first symbol at the time of the interaction. In some embodiments, the first symbol is a letter or a number.

Some embodiments of the present methods further comprise: determining whether the first input corresponds to the depicted first symbol. Some embodiments further comprise: if the first input does not correspond to the depicted first symbol, informing the first player that the first input does not correspond to the depicted first symbol. Some embodiments further comprise: storing a record, associated with the first player, of whether the first input corresponds to the depicted first symbol.

Some embodiments of the present methods further comprise: providing a user input to a hand-held device that is connected to the display, the user input causing the display to depict the first symbol. In some embodiments, the handheld device comprises a smartphone or tablet wirelessly connected to the display, and the user input is transmitted wirelessly to the display.

Some embodiments of the present methods further comprise: causing the display to depict a second symbol at the time of an action by a second player or an interaction between the second player and the piece of athletic equipment or person (e.g., a human torso); and receiving from the second player a second input asserted to correspond to the depicted second symbol.

Some embodiments of the present apparatuses comprise: a display configured to be coupled to a piece of athletic equipment (e.g., a tackling dummy) or person (e.g., a human torso) and configured to depict a plurality of symbols one at a time. In some embodiments, the display is configured to be coupled to the piece of athletic equipment or person by a strap, harness, hook-and-loop fasteners, clips, buttons, and/or adhesive.

Some embodiments of the present apparatuses further comprise: a sensor configured to be coupled to the piece of athletic equipment or person and to communicate with the handheld device. In some embodiments, the sensor comprises an accelerometer. In some embodiments, the display includes memory and a processor configured to execute instructions from the memory, the instructions configured to cause the display to: upon receipt of a signal from the sensor, transmit an indication of one of the symbols depicted by the display. In some embodiments, the display includes memory and a processor configured to execute instructions from the memory, the instructions configured to cause the display to: upon receipt of a signal from the sensor, depict a different one of the symbols that was depicted when or prior to the signal was received.

In some embodiments of the present apparatuses, the display comprises a connection port configured to connect the display to a handheld device that is remote from the display, and the display is configured to receive an input from the handheld device to cause the display to depict one the symbols. In some embodiments, the handheld device is configured to be physically tethered to the display by a communications cable. In some embodiments, the handheld device comprises a smartphone, remote, or tablet wirelessly connected to the display, the handheld device is configured to receive a user input and transmit the user input wirelessly to the display.

Some embodiments of the present apparatuses further comprise: the handheld device, where the handheld device includes memory and a processor configured to execute instructions from the memory, the instructions configured to cause the handheld device to: prompt a user to provide a first input associated with a first player and asserted to correspond to a first one of the symbols depicted on the display. In some embodiments, the instructions are further configured to cause the handheld device to: determine whether the first input corresponds to the depicted first symbol. In some embodiments, the handheld device includes memory and a processor configured to execute instructions from the memory, the instructions configured to cause the handheld device to: prompt a user to provide a first input indicative of whether the first player correctly identified the first depicted signal after an action by the player or an interaction by the player with the piece of athletic equipment or person. In some embodiments, the action or interaction includes hitting the piece of athletic equipment. In some embodiments, the instructions are further configured to cause the handheld device to: store a record, associated with the first player, of whether the first input corresponds to the depicted first symbol. In some embodiments, the instructions are further configured to cause the handheld device to: output a record, associated with the first player, of whether the first input corresponds to the depicted first symbol.

Some embodiments of the present apparatuses further comprise: a server remote from the handheld device, the server including memory and a processor configured to execute instructions from the memory, the instructions configured to cause the server to: receive from the handheld device a plurality of records associated with a plurality of players; and store the received records.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1:
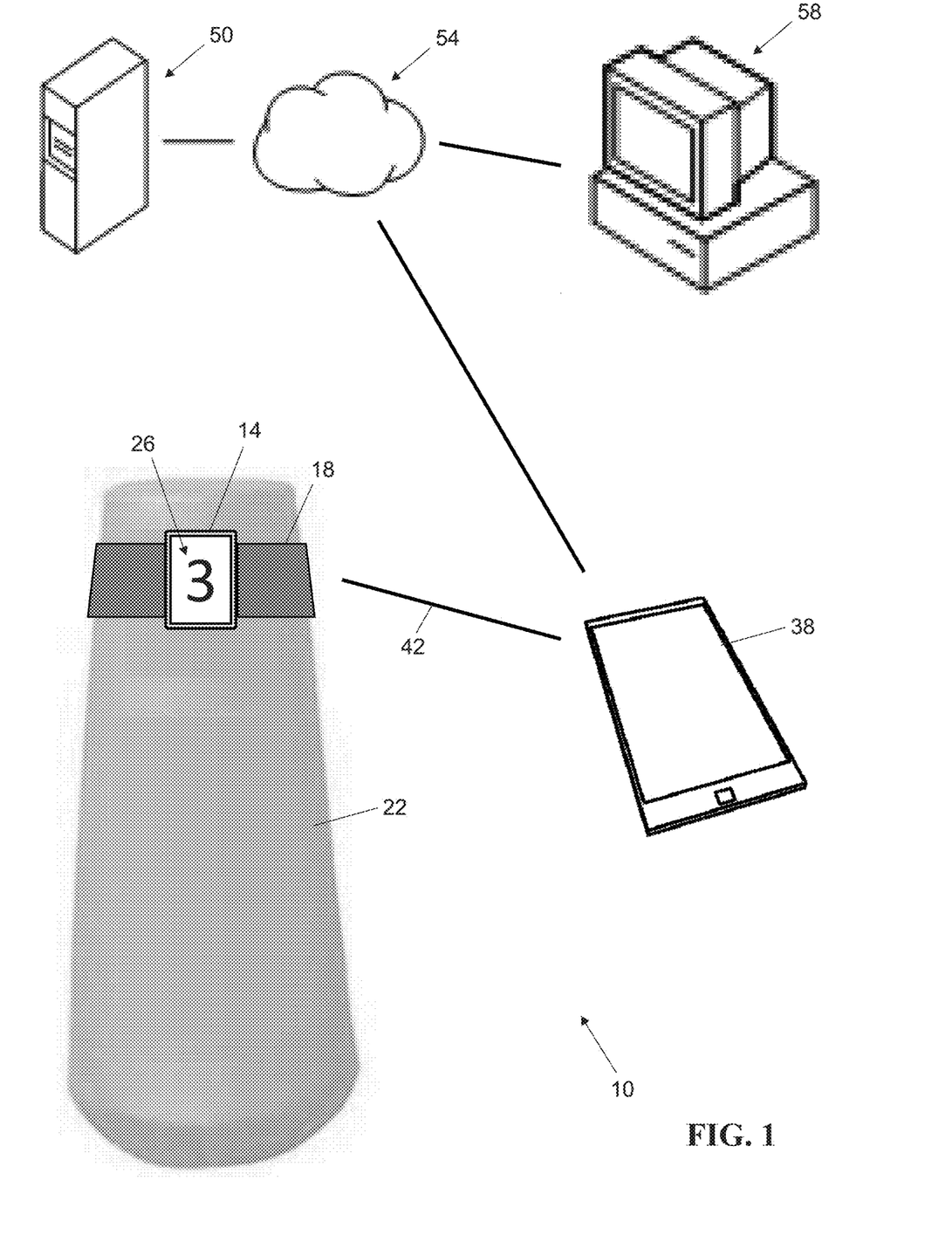
FIG. 1 depicts a schematic block diagram of an embodiment of the present systems.
Figure 2:
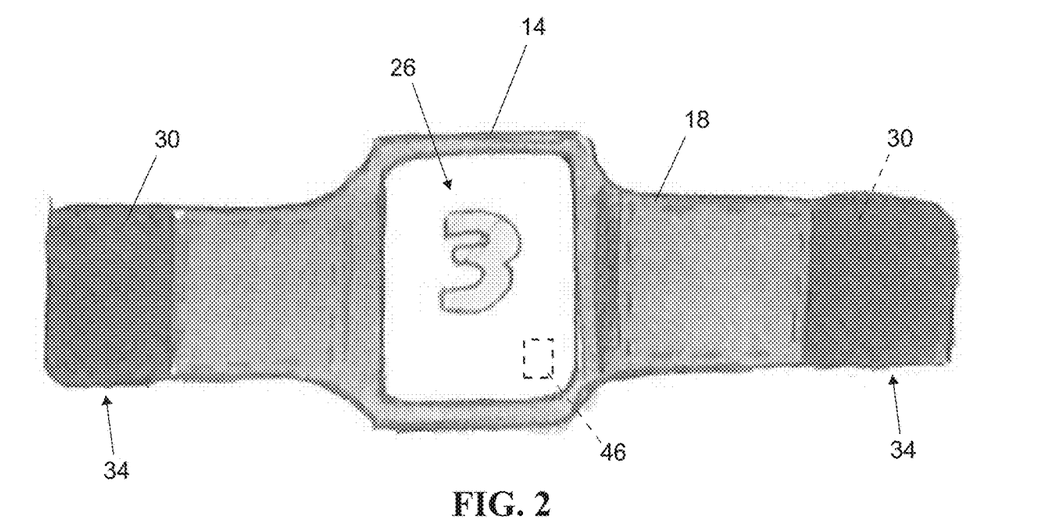
FIG. 2 depicts a schematic front view of an embodiment of the present displays with a strap shown in an open configuration.
Figure 3:
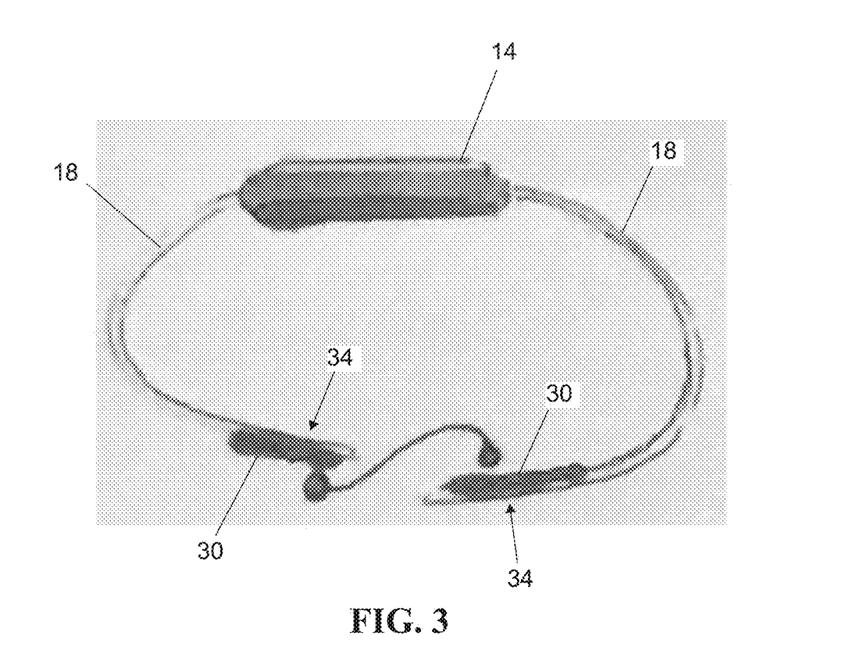
FIG. 3 depicts a schematic top view of the display of FIG. 1 illustrating how the strap may be coupled to a piece of athletic equipment.

Referring now to the drawings and, more particularly to FIGS. 1-3, FIG. 1 shows an embodiment 10 of the present training systems; FIG. 2 shows a schematic front view of an embodiment of a display 14 with a strap 18 shown in an open configuration; and FIG. 3 shows a schematic top view of display 14 illustrating how strap 18 may be wrapped around a piece of athletic equipment 22. In this embodiment, equipment 22 is a football tackling dummy; however, in other embodiments, equipment 22 can comprise any piece of athletic equipment for or with which it may be beneficial to train players to maintain their head/gaze in a particular orientation and/or to maintain their attention at a particular time or place in a sequence of action or events when interacting with the equipment. When the piece of athletic equipment is a punching bag, the display can depict a number as or before the player is about to hit the punching bag. When the piece of athletic equipment is a soccer goal, the display can depict a number as or before the player is about to kick a ball into the goal. When the piece of athletic equipment is a pole or other structure supporting a basketball hoop, the display can depict a number as or before the player dribbles the ball. In some instances, the piece of athletic equipment may not typically be used in the sport for which it is used with the present systems and methods for training; for example, the piece of athletic equipment may be a stand or support that simply supports the display, and the display can depict a number as or before a player dribbles a basketball. In other instances, the strap may encircle a human torso (e.g., around the chest of a coach).

In the depicted configuration, display 14 is coupled to an upper half of the tackling dummy and, more specifically, is closer to an upper end of the dummy than to a vertical center of the tackling dummy. In this position, a player crouched down or running to tackle the tackling dummy will typically be forced to keep their head up and gaze directed upward toward the display to read or visually recognize a symbol 26 depicted on the display.

As shown, the depicted embodiment of display 14 is configured to be coupled to the tackling dummy via strap 14 with hook-and-loop fasteners 30 at its ends 34. In other embodiments, strap 14 may include any suitable fastener or fasteners at its ends 34, such as, for example, snaps, clips, buttons, and/or the like. In other embodiments, strap 14 may form a continuous loop that slips over the upper end of equipment 22 (e.g., all or a portion of the strap may be elastic). In additional embodiments, display may comprise a harness and/or may be configured to be coupled to equipment 22 via clips, adhesive, and/or any other attachment structure that permits the display to function in the manner described in this disclosure. Strap 18 and/or other attachment structure(s) for supporting the display relative to the equipment may be integral to the display or may include or be attached to a separate case or support in which the display may be removably received, or with which the display may be detachably coupled. For example, in embodiments discussed below in which display 14 comprises an iPad or other tablet, the iPad or tablet can be disposed in a standard case that is attached to strap 18 (or other harness or attachment structure(s)).

Display 14 is configured to depict a plurality of symbols 26 one at a time. For example, a first symbol can be depicted for a first player while or just before the first player tackles a tackling dummy, a second symbol can be depicted for a second player while or just before the second player tackles the tackling dummy, and so on. Symbol(s) 26 may include a number (e.g., "3" as shown), as shown, and/or may include any of various other types of symbols, for example: a letter (e.g., "A"), an image or picture or drawing (e.g., of an animal, such as a cat, or a cartoon character, such as Mickey Mouse), and/or any other type of symbol that can be identified by a player in connection with the player's interaction with a piece of athletic equipment to which the display is coupled. While any nearly any type of symbol may be used, it may be helpful in at least some instances (e.g., with cartoon characters) to use symbols with which players are likely to be familiar, to reduce the possibility of confusion or lack of context (as opposed to failure to view a symbol) causing a player to incorrectly identify a symbol.

In some embodiments, display 14 is configured to receive instructions from a handheld device is configured to receive an input from a controller 38, such as a handheld device (as shown), to cause the display to depict one of the symbols (26). As shown in FIG. 1, handheld device 38 may be remote from the display; however, in other embodiments, controller 38 may be physically coupled to strap 18, such as, for example, on an opposite side of equipment 22 to allow a coach or trainer holding equipment 22 to operate the controller. Controller 38 can comprise, for example, a smartphone (e.g., an iPhone, an Android smartphone, and/or the like), a tablet computer (e.g., an iPad, an Android tablet computer, and/or the like), a desktop computer, and/or the like. In such embodiments, the controller can be readily programmed to perform one, all, or any subset of, the following functions (among others):
- communicate (e.g., wirelessly) with display 14;
- cause display 14 to depict symbols 26;
- prompt, via controller 38 and/or display 14, a user (e.g., a player, coach, or trainer) to provide an input, via controller 38 and/or display 14, associated with a player and corresponding to the player's identification of a depicted symbol;
- receive, via controller 38 and/or display 14, from a user (e.g., a player, coach, or trainer) inputs of player identifications of the depicted symbols;
- compare received player identifications with the respective depicted symbols;
- store the player identifications, respective depicted symbols, and/or comparisons; and/or
- transmit the player identifications, respective depicted symbols, and/or comparisons.

Various actions and steps involved in the above functions are described in more detail above and below, for example, with reference to FIG. 4.

As indicated by line 42, in the depicted embodiment, handheld device 38 is configured to communicate wirelessly with display 14; however, in other embodiments, handheld device 38 is physically tethered to display 14 by a communications cable. In some embodiments, such as those in which display 14 is physically tethered to a separate controller 38, the display can be a passive display that does not include its own independent processor; for example, the display can function to depict content generated (e.g., a symbol selected) by the controller 38 without a need for the display to generate content to be depicted.

In other embodiments, display 14 includes its own memory and a processor configured to execute instructions from the memory. Such embodiments of display may also be configured to wirelessly connect and communicate with controller 38 via, for example, WiFi (an IEEE 802.11 protocol), ZigBee or other IEEE 802.15 protocol, Bluetooth, and/or any other communication protocol that allows the display to communicate with the controller as described in this disclosure. For example, display 14 can include an iPad or other (e.g., Android) tablet computer. In such embodiments, the display can be readily programmed to perform one, all, or any subset of, the following functions (among others):
- communicate (e.g., wirelessly) with controller 38;
- independently depict symbols 26;
- prompt, via controller 38 and/or display 14, a user (e.g., a player, coach, or trainer) to provide an input associated with a player and corresponding to the player's identification of a depicted symbol;
- receive, via controller 38 and/or display 14, from a user (e.g., a player, coach, or trainer) inputs of player identifications of the depicted symbols;
- compare received player identifications with the respective depicted symbols;
- store the player identifications, respective depicted symbols, and/or comparisons; and/or
- transmit the player identifications, respective depicted symbols, and/or comparisons.

Various actions and steps involved in the above functions are described in more detail above and below, for example, with reference to FIG. 4. In embodiments in which display 14 has its own memory and processor, controller 38 can be a relatively simply device, such as an infrared remote control or wireless presenter (e.g., such as may be used to remotely advance presentation slides on a laptop computer). Such a controller may, for example, have as little as one button or user input to permit a user (e.g., coach or trainer) to advance the depicted symbols.

In some embodiments, system 10 also includes a sensor coupled to the piece of athletic equipment and in communication with display 14. For example, in the embodiment shown, display 14 includes an accelerometer 46 that can indicate when equipment 18 is impacted by a player. In some such embodiments, the instructions in the memory of the display can be configured to take action upon receipt of a signal from sensor 46. For example, the display can automatically transmit to controller 38 an indication of a symbol 26 depicted by display when the sensor indicates that a tackling dummy has been hit by a player; in this example, the display can sequentially depict a plurality of symbols—each one depicted for a relatively short period of time (e.g., less than five seconds, less than 2 seconds, one second, or less than one second)—to ensure that a player must identify a depicted symbol in close temporal proximity to (e.g., less than one second, less than 0.5 seconds, or less than 0.25 seconds before) the time at which the player hits the tackling dummy (or similarly for other types of interactions with other types of equipment 18). By way of further example, the display can automatically advance to depicting a different one of the symbols than was depicted when or just prior to when the sensor indicates that a tackling dummy has been hit by a first player. Such advancement to subsequent signals can ensure that subsequent players (or subsequent hits by the same player) cannot be expected to repeat the symbol, thereby ensuring that a player thereafter hitting the tackling dummy (or otherwise interacting with other types of equipment 18) must view the depicted symbol again at the time of the subsequent hit or other interaction.

In the embodiment shown, system 10 also includes an optional administrative subsystem 50 that may be accessed (e.g., communicated with) via the internet 54, such as by handheld device 38 and/or an additional user interface device 58 (e.g., desktop computer, as shown, or a smartphone or tablet computer). Administrative subsystem 50 is typically provided by one or more servers (e.g., server 202 described below), whether individual or part of a larger server system, such as is offered by Amazon Web Services or "AWS". As is known in the art, such servers typically include memory and at least one processor configured to execute instructions from the memory. In embodiments that include such an administrative subsystem 50, the administrative subsystem can be readily programmed to perform one, all, or any subset of, the following functions (among others):

- communicate (e.g., wirelessly) with display 14, controller 38, and/or user interface device 58;
- transmit software modules and/or subsets of symbols 26;
- prompt, via controller 38 and/or display 14, a user (e.g., a player, coach, or trainer) to provide a record associated with a player and including the player's identification of a depicted symbol;
- receive, from controller 38 and/or display 14, from player identifications of the depicted symbols;
- compare received player identifications with the respective depicted symbols;
- store the player identifications, respective depicted symbols, and/or comparisons; and/or
- transmit the player identifications, respective depicted symbols, and/or comparisons (e.g., to user interface device 58).

Figure 4:
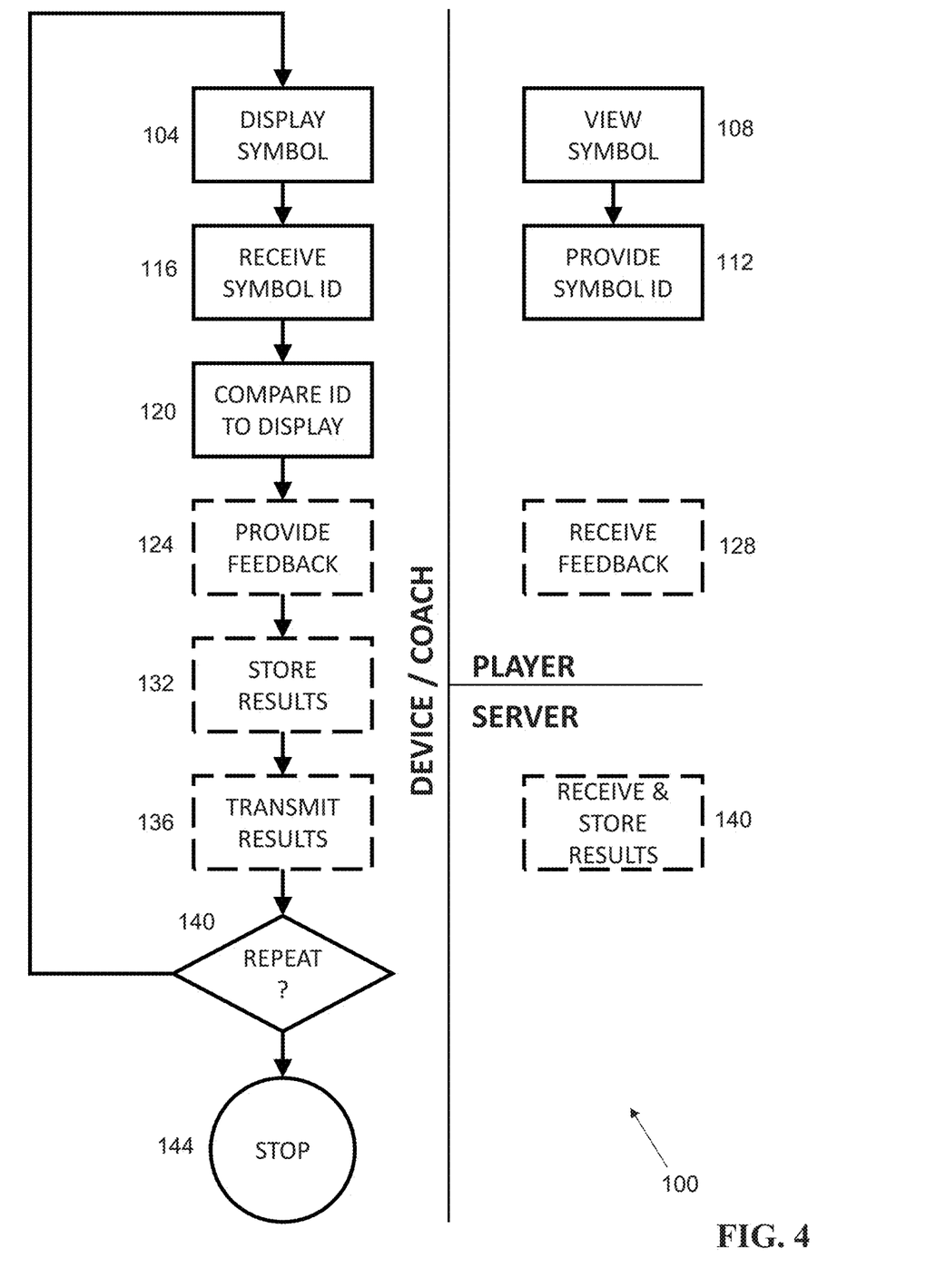
FIG. 4 depicts a flowchart of one embodiment of the present methods.

FIG. 4 depicts a flowchart of an embodiment 100 of the present methods.

At a step 104, a symbol (e.g., 26) is displayed. For example, a user (e.g., a player, a coach, or a trainer) can cause a display (e.g., 14) coupled to a piece of athletic equipment (e.g., a tackling dummy 22) to depict a first symbol (e.g., 26) at the time of (e.g., prior to and/or during) an action by a player (e.g., basketball player dribbling a basketball) and/or an interaction by a player with the piece of athletic equipment (e.g., a football player hitting a tackling dummy). In some embodiments, a user provides an input (e.g., push a button, touch a portion of a touchscreen, and/or otherwise actuates) a controller (e.g., handheld device 38) in communication with the display (e.g., 14) to directly cause the display to depict the symbol. In some such embodiments, the user's input also selects which symbol is depicted; for example, the controller can have a physical keypad or can depict a keypad on a touchscreen, and the user can select a key corresponding to a desired symbol (e.g., the user can select a key corresponding to the number "9" to depict the number "9" on the display). In others of such embodiments, the user's input causes the controller or the display to depict a number that is either next in a predetermined sequence or selected at random or pseudo-random from a library of available symbols.

In other embodiments, the user provides an input to the display (e.g., 14) or to a controller (e.g., handheld device 38) in communication with the display (e.g., 14) to initiate a software module that causes the display to depict a sequence of symbols, typically one at a time, such as to permit a plurality of players to each view a different symbol at the time of performing an action or interaction, or to permit a single player to view a different symbol at the time of performing each of a plurality of actions or interactions. Such a software module can depict symbols in a predetermined order, or can select and depict symbols from a library of available symbols in a random or pseudo-random order. In some embodiments, the software module downloads from an administrative subsystem (e.g., 50) or server (e.g., 202) thereof a set of symbols or file with a predetermined order in which to display the symbols.

At a step 108, the player can then view the symbol. Once the player performs the action or interaction, at a step 112, the player provides an identification of the symbol. For example, the player can provide an audible symbol identification (i.e., an indication of a symbol the player believes was depicted). Alternatively, the player can enter the symbol identification directly into the display (e.g., display 14) or a separate controller (e.g. handheld device 38), for example audibly in a form that can be recognized by an interactive voice response (IVR) software module, or physically via a user input such as a keypad (e.g., 320), mouse or pointer (e.g., 318), touchscreen, or the like of or coupled to the display (e.g., 14) or controller (e.g., 38).

At a step 116, the symbol identification is received. For example, the symbol may be received audibly by a coach or trainer. The coach or trainer can then enter the symbol identification into a the display (e.g., 14) or a separate controller (e.g. handheld device 38), for example audibly in a form that can be recognized by an interactive voice response (IVR) software module, or physically via a user input such as a keypad (e.g., 320), mouse or pointer (e.g., 318), touchscreen, or the like of or coupled to the display (e.g., 14) or controller (e.g., 38). The display and/or controller thus receives an input associated with the player and asserted (by the player) to correspond to the symbol depicted at the time of the player's action or interaction. Alternatively, the display (e.g., 14) or a separate controller (e.g. handheld device 38) can receive the symbol identification directly from the player, for example audibly in a form that can be recognized by an interactive voice response (IVR) software module, or physically via a user input such as a keypad (e.g., 320), mouse or pointer (e.g., 318), touchscreen, or the like of or coupled to the display (e.g., 14) or controller (e.g., 38). In some embodiments of the present systems, the display (e.g., 14) and/or the optional controller 38 (e.g., handheld device 38) is programmed to prompt a user for an input indicative of the player's symbol identification.

At a step 120, the player's symbol identification is compared to the symbol that was actually depicted at the time of the action or interaction to determine whether the player correctly identified the depicted symbol (i.e., whether the first input corresponds to the depicted first symbol). In the simplest example, a coach or trainer mentally compares the symbol identification with the depicted symbol. The coach or trainer can then input into the controller (e.g., handheld device 38) and/or display (e.g., 14) indicative of whether the player correctly identified the depicted symbol; in such configurations, neither the display (e.g., 14) or the optional controller (e.g., handheld device 38) necessarily needs to keep a record of which symbol was depicted or which symbol was identified, and may instead merely store a record of the results of the comparison (i.e., whether the player correctly identified the symbol depicted at the designated time). In some embodiments of the present systems, the display (e.g., 14) and/or the optional controller 38 (e.g., handheld device 38) is programmed to prompt a user for an input indicative of the results of the comparison. Alternatively, the display (e.g., 14) and/or the controller (e.g., handheld device 38) performs the comparison. In some embodiments, signals indicative of the depicted symbol and the player's symbol identification are transmitted by the display (e.g., 14) and/or the optional controller (e.g., handheld device 38) to an administrative subsystem (e.g., 50), for example a server (e.g., 202) thereof, and the administrative subsystem performs the comparison.

At an optional step 124, feedback is provided to the player, which the player receives at a step 128. For example, if the symbol identification does not correspond to the symbol depicted at the time of the player's action or interaction, the player can be informed that they did not correctly identify the depicted symbol. In the simplest example, a coach or trainer can audibly tell the player whether the player's symbol identification was correct (e.g., that the identified symbol was not the one depicted). Alternatively or additionally, the display (e.g., 14), optional controller (e.g., handheld device 38), and/or administrative subsystem (e.g., 50) can transmit electronically to the user an indication of whether the player's symbol identification corresponded to the depicted symbol. For example, a message with the depicted symbol, the player's symbol identification, and/or the results of the comparison thereof (and/or a set including multiple pieces of such data corresponding to multiple actions and/or interactions by the player) can be sent via email, text or SMS message, MMS message, and/or to a corresponding application or "app" on a smartphone or tablet computer associated with the player, or downloaded or otherwise accessed by the player via a user-interface device (e.g., 58).

At an optional step 132, a record associated with the player is stored with the depicted symbol, the player's symbol identification, and/or the results of the comparison thereof. For example, the display (e.g., 14) and/or the optional controller (e.g., handheld device 38) can the record in memory. Alternatively or additionally, at an optional step 136, display (e.g., 14) and/or the optional controller (e.g., handheld device 38) outputs and transmits such a record to an administrative subsystem (e.g., 50) and, at an optional step 140, the administrative subsystem receives and stores the record in memory (e.g., storage) associated with the administrative subsystem, for example a server (e.g., 202) thereof.

At a step 144, it is determined whether the process should be repeated, either for a different player or for a subsequent action or interaction of the same player. For example, the player, a coach, or a trainer may simply decide to stop. Alternatively, the display (e.g., 14) or optional controller (e.g., handheld device 38) may determine that a predetermined number of repetitions have been completed and automatically terminate the process. If the process is not repeated, the depicted embodiments terminates at step 144. If the process is to be repeated, an additional symbol is depicted at step 104 and the above-described process repeats.

Figure 5:
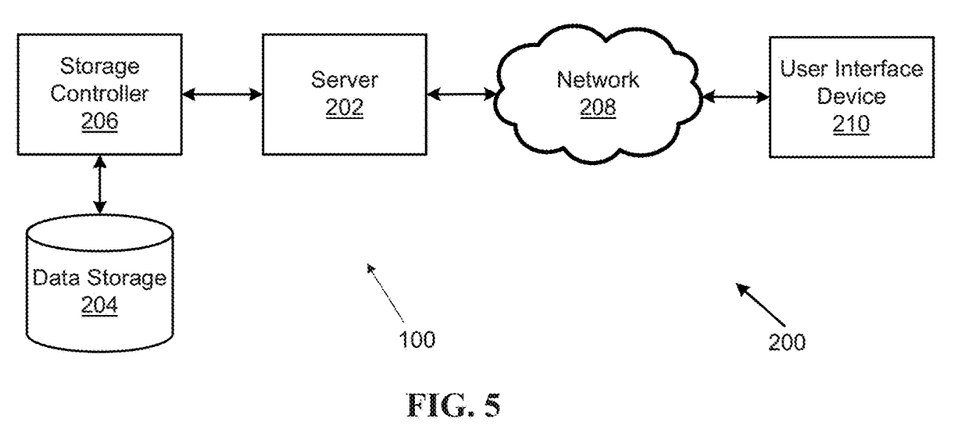
FIG. 5 is a schematic block diagram illustrating an embodiment of an administrative subsystem of the present systems in communication with a user device of the present systems via a network.

FIG. 5 conceptually illustrates one embodiment of a system 200 that can be used to implement portions of at least some of the present embodiments, namely, an administrative subsystem 50. In the illustrated embodiment, system 200 may include a server 202, a data storage device 204, a network 208, and a user interface device 210. In this embodiment, administrative subsystem 50 comprises server 202, data storage 204, and storage controller 206.

User interface device 210 can include any of various types of devices. Display 14 can act as a user interface device 210, such as, for example, when display 14 is provided by an iPad or Android tablet computer with its own communications interfaces that permit display 14 to communicate with administrative subsystem 50 directly rather than via optional controller 38. Controller 38 can act as a user interface device 210 when controller is provided by an iPad or Android table computer with its own communications interfaces that permit controller 38 to communicate with administrative subsystem 50 directly rather than via a personal computer. Further, user interface device 58 (e.g., desktop computer, as shown, or a smartphone or tablet computer) can act as user-interface device 210 to access administrative subsystem 50, without necessarily also participating in directly controlling display 14 or controller 38 in the depiction of symbols 26 or primary collection of data related to players' symbol identifications. In some embodiments, display 14 and/or controller 38 is/are configured to be physically connected (e.g., via a USB cable) to an additional user-interface device 210 (e.g., a personal computer) and the connected user-interface device 210 is used to transmit data related to player symbol identifications, such as, for example, via email or FTP.

In some embodiments, server 202 may include storage device 204 (e.g., a server housing or enclosure may house storage device 204). In some embodiments, system 200 may include a storage controller 206, and/or a storage server configured to manage data communications between data storage device 204 and server 202 and/or other components in communication with network 208. In some embodiments, storage controller 206 may be coupled to network 208 (e.g., such that server 202 communicates or is configured to communicate with storage controller 206 and/or storage device 204 via network 208. In a general embodiment, system 200 may be configured to store data (e.g., records of player performance, etc.). In some embodiments, system 200 is configured to permit multiple uses and/or functions to or with the data. For example, in some embodiments, system 200 is configured to permit multiple users (e.g., coaches) to interact with the system simultaneously (e.g., a first coach entering data for individual players on a first team, a second coach entering data for individual players on a second team, a third coach reviewing historical data for a recruit being considered for or player joining a third team, etc.), such as, for example, simultaneously via multiple user interface devices 210.

In some embodiments, server 202 is configured to access data stored in data storage device(s) 204 via a Storage Area Network (SAN) connection, a LAN, a data bus, or the like. Data storage device 204 may include a hard disk, including hard disks arranged in an Redundant Array of Independent Disks (RAID) array, a tape storage drive comprising a magnetic tape data storage device, an optical storage device, or the like. In one embodiment, data storage device 204 stores various types of data, as described in more detail below. In some embodiments, server 202 and/or storage device(s) 204 are configured to create a back-up (full and/or partial back-up) of the data.

In some embodiments, user-interface device 210 is referred to broadly and comprises a suitable processor-based device such as, for example, a desktop computer, a laptop computer, a Personal Digital Assistant (PDA), and/or a mobile communication or organizer device (e.g., a cellular phone, smartphone, etc.) having access to the network 208. In some embodiments, user interface device 210 can be configured to access the Internet to access a web application or web service hosted by server 202 and thereby provide a user interface for enabling a user to enter or receive information (e.g., from server 202). For example, user may receive or view, via user interface device 210, a webpage or an application screen (e.g., server 202 can transmit instructions to user interface device 210 to instruct or cause the user interface device to render a webpage or application screen). By way of further example, in some embodiments, user interface device 210 can be configured to receive from a user (e.g., via user-input, such as a microphone, keyboard, mouse, touchscreen, and/or the like), can be configured to prompt (e.g., audibly and/or visually) a user for (e.g., server 202 can be configured to instruct user-interface device 210 to prompt a user for), and/or can be configured to transmit to server 202 (e.g., via network 208), instructions (e.g., a voice input with or indicative of information). For example, user interface device 110 can audibly and/or visually prompt a user for a voice input.

Network 208 may facilitate communications of data between server 202 and user interface device 210. Network 208 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another.

In some embodiments, the functions described in this disclosure may be performed by server 202 (e.g., user interface device 210 may provide a terminal for accessing the computing/processing function of the server); may be performed by server 202 and user interface device 210 (e.g., server 202 may perform some processing and user interface device 210 may perform some processing); or may be performed entirely by user interface device 210. For example, in some embodiments, a symbol library (and/or one or more depiction protocols, one or more depiction software modules, and/or the like) may be downloaded to a user interface device 210 before beginning a training cycle, such that all training functions (as opposed to storage and recall functions) of the present system and methods may be performed throughout the training cycle without depending on a connection to server 202 via network 208.

Figure 6:
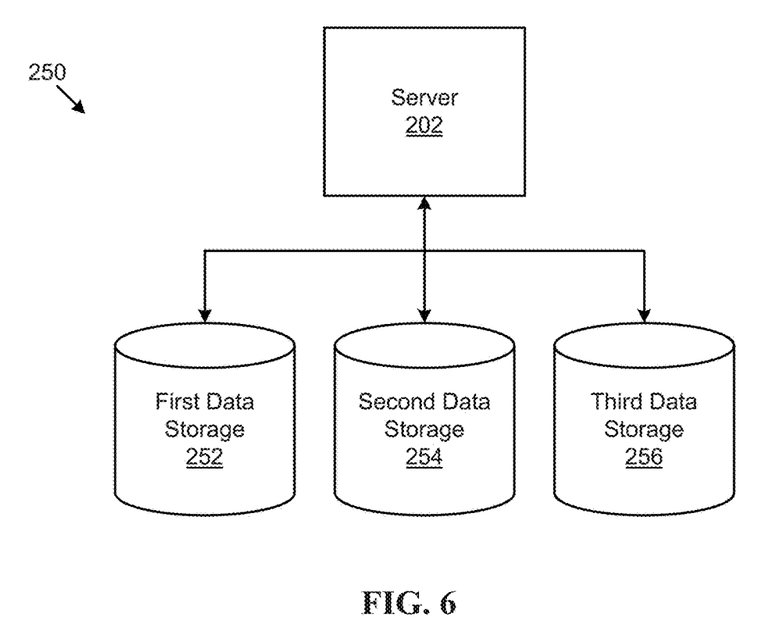
FIG. 6 is a schematic block diagram illustrating a database suitable for use in some of the present administrative subsystems.

FIG. 6 illustrates one embodiment of a data management system 250 configured to store and manage data for at least some of the present embodiments. In one embodiment, the system 250 may include a server 202. The server 202 may be coupled to a data-bus 202. In some embodiments, the system 250 may also include a first data storage device 252, a second data storage device 254 and/or a third data storage device 256. In further embodiments, the system 250 may include additional data storage devices (not shown). In such an embodiment, each data storage device 252-256 may host a separate database of information. For example, in some embodiments, each of storage devices 252-256 can store or be configured to store different types of data (e.g., storage device 252 storing team records for each of one or more sports, storage device 254 storing player records related to individual players, storage device 256 storing data related to player symbol identifications). In some embodiments, storage devices 252-256 may be arranged in a RAID configuration for storing redundant copies of a database or databases (e.g., through synchronous or asynchronous redundancy updates).

In various embodiments, server 202 may communicate with data storage devices 252-256 over a data-bus (illustrated by arrows between server 202 and storage devices 252-256). In such embodiments, the data-bus may comprise a SAN, a LAN, or the like. The communication infrastructure may include Ethernet, Fibre-Channel Arbitrated Loop (FC-AL), Small Computer System Interface (SCSI), and/or other similar data communication schemes associated with data storage and communication. For example, server 202 may communicate indirectly with data storage devices 252-256, (e.g., via a storage server or storage controller 206).

Server 202 may host one or more software applications (e.g., web- and/or Internet-accessible software applications) configured and/or programmed to perform the functions described in this disclosure. The software application may further include modules configured to interface with data storage devices 252-256, network 208, a user (e.g., via a user-interface device 210), and/or the like. In a further embodiment, server 202 may host an engine, application plug-in, or application programming interface (API). In another embodiment, server 202 may host a web service and/or other web accessible software application.

Figure 7:
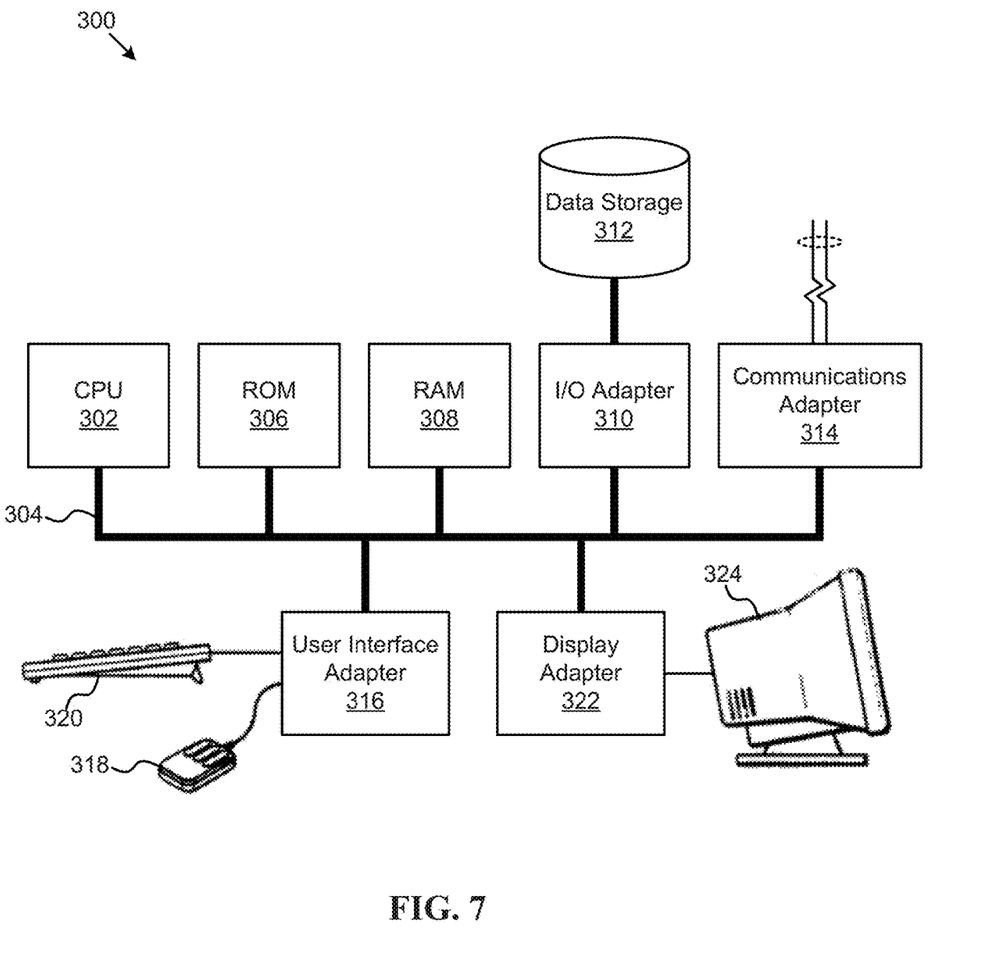
FIG. 7 is a schematic block diagram illustrating one embodiment of a computer suitable for use with or in at least some of the present systems, for example as an administrative subsystem.

FIG. 7 illustrates a computer system 300 adapted according to certain embodiments of server 202 and/or user interface device 210. Central processing unit (CPU) 302 is coupled to system bus 304. CPU 302 may be a general purpose CPU or microprocessor. The present embodiments are not restricted by the architecture of CPU 302, as long as CPU 302 supports the modules, configurations, and/or operations as described herein. CPU 302 may execute the various logical instructions according to the present embodiments. For example, CPU 302 may execute machine-level instructions according to the exemplary operations described below. Computer system 300 also may include Random Access Memory (RAM) 308, which may be SRAM, DRAM, SDRAM, or the like. Computer system 300 may utilize RAM 308 to store the various data structures used by a software application configured as described in this disclosure. Computer system 300 may also include Read Only Memory (ROM) 306 which may be PROM, EPROM, EEPROM, optical storage, or the like. ROM 306 may store configuration information for booting computer system 300. RAM 308 and ROM 306 may also store user and/or system 100 data.

Computer system 300 may also include an input/output (I/O) adapter 310, a communications adapter 314, a user interface adapter 316, and a display adapter 322. I/O adapter 310, communications adapter 314, and/or interface adapter 316 may, in some embodiments, enable or a user to interact with computer system 300 (e.g., to input information, such as, for example, to input a player's indication of a depicted symbol, retrieve past comparisons of player indications of depicted symbols to the actual depicted symbols, view team statistics related to performance, and/or the like)). In a further embodiment, display adapter 322 may display a graphical user interface associated with a software or web-based application.

I/O adapter 310 may connect to one or more storage devices 312, such as one or more of a hard drive, a Compact Disk (CD) drive, a floppy disk drive, a tape drive, to the computer system 300. Communications adapter 314 may be adapted to couple computer system 300 to network 106, which may, for example, be one or more of a LAN, WAN, and/or the Internet. User interface adapter 316 couples user input devices, such as a keyboard 320, a pointing device 318, and a microphone and/or audio speaker, to computer system 300. Display adapter 322 may be driven by CPU 302 to control the display on display device 324.

The present embodiments are not limited to the architecture of system 300. Rather computer system 300 is provided as an example of one type of computing device that may be adapted to perform the functions of a server 202 and/or user interface device 210. For example, any suitable processor-based device may be utilized including without limitation, including personal data assistants (PDAs), computer game consoles, smart phones, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 8:
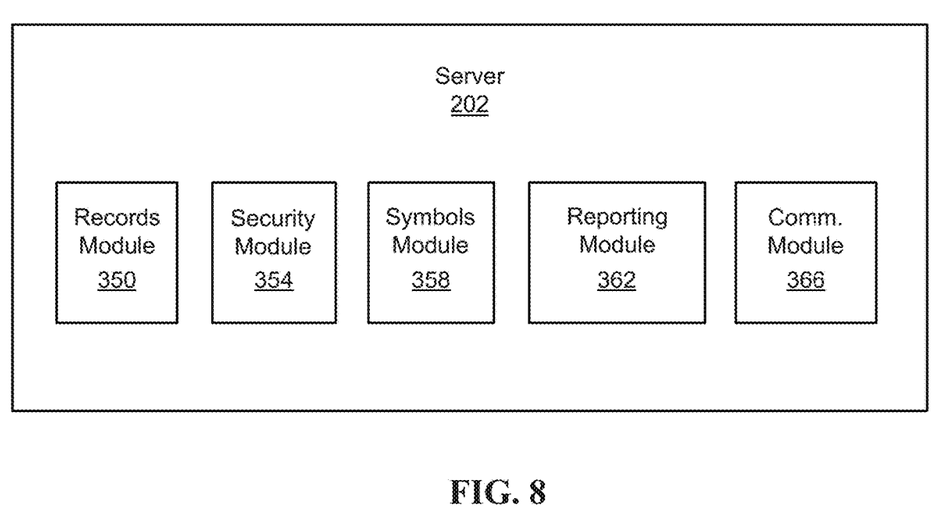
FIG. 8 depicts a schematic block diagram illustrating one embodiment of a server suitable for use with or in some of the present systems, for example as an administrative subsystem.

FIG. 8 illustrates a schematic block diagram of a further embodiment of a server 202 for use in the present methods and systems. In the embodiment shown, server 102 includes a plurality of modules configured to perform the functions and method/process steps described in this disclosure. Although server 202 is described as having a plurality of modules, in some embodiments, such modules are merely conceptual (e.g., such modules are not necessarily distinct physical pieces or segments of code, and may instead be combined into multiple combinations of the modules described, or into a single module that is configured to perform some or all of the functions described). In other embodiments, the modules described may be combined, omitted, and/or substituted in any combination of individual modules and/or functions described. In the embodiments shown, server 102 broadly includes a records module 350, a security module 354, a sports module 358, a reporting module 362, and a communications module 366.

In the embodiment shown, server 202 (e.g., records module 350) is configured to manage creation and editing of records related to individual players, teams with which the players are or can be associated, coaches and/or trainers with which the players and/or teams are or can be associated with, and sports with which the various other entities can be associated with. Typically a team will be associated with only one sport, whereas a player or a coach may be associated with multiple sports. Records module 350 can be configured to permit an authorized user (e.g., the player himself or herself, or a parent thereof) to change the team(s), sport(s), and/or coach(es) or trainer(s) with which the player is associated. Records module 350 can also be configured to permit an authorized user (e.g., the coach or trainer himself or herself, or a parent thereof) to change the team(s), sport(s), and/or player(s) with which the coach or trainer is associated. In some instances, records module 354 requires action by multiple users to complete create or change an association. For example, if a player wishes to join a new team, the records module may require both the player and a coach or other administrator associated with the team to confirm the desired association.

In the embodiment shown, security module 354 is generally configured to manage and/or control security and/or access to server 202 (e.g., by one or more user-interface devices). For example, in the embodiment shown, server 202 (e.g., security module 354) is configured to associate each of one or more user-interface devices with one or more players, coaches or trainers, or other users. For example, server 202 (e.g., security module 354) can be configured to associate each of one or more user-interface devices 210 with a user responsive to receiving from the user-interface device a username and password (or other identifying information) corresponding to the user. In some embodiments, security module 354 is configured to permit different levels of access for different users. Some users or types of users may be system administrators with administrator-level access to system 10, such as, for example, permission to read and edit files. Some users may have more-limited access to system 10, such as, for example, permission read and edit only certain files, permission to only read files, etc.

In some embodiments, server 202 (e.g., security module 354) is generally configured to interface with the one or more storage devices to read, edit, and/or verify data in records corresponding to players, coaches or trainers, teams, sports, and/or the like. For example, records module 358 can be configured to permit a system administrator to add, delete, modify, activate, inactivate, and/or suspend accounts (e.g., accounts associated with other users) in system 10. Similarly, server 202 can be configured to permit (e.g., receive instructions from) system administrators to add, delete, edit, activate, inactivate, and/or change records, files, or other content piece-by-piece and/or across sections (e.g., an individual player record, all player records associated with a particular team, all player records associated with a particular sport, and/or the like). Server 202 can associate a user-interface device 210 with a user by any suitable method or function, such as, for example, registering an IP address of the user-interface device, registering a network to which the user-interface device is connected or communicating; registering a tracking cookie to the user-interface device (e.g., a cookie with a predetermined authorization time, such as 1, 2, 6, 12, or 24 hours; or a cookie with without a time limit or expiration, such as for a non-public computer); and/or the like. In some embodiments, server 102 (e.g., security module 354) is configured to: disassociate the user-interface device 210 from a user (or other user with which the user-interface device is associated) responsive to receiving a logout instruction from the user-interface device or a period of inactivity that exceeds a predetermined inactivity threshold (e.g., 5, 10, 30, 60 minutes of inactivity such as not receiving an instruction from the user-interface device). In some embodiments, server 202 (e.g., security module 354) is configured to generate passwords (e.g., temporary passwords) randomly and/or sequentially. For example, in some embodiments, server 202 is configured to generate and/or transmit a temporary password for a new user, and/or to prompt the new user to change the temporary password to a user-defined password (e.g., the first time the new user logs onto or otherwise connects to the system).

In the embodiment shown, symbols module 358 is configured to store a library of available symbols and/or orders of sequences in which available symbols or subsets thereof can be depicted for the present methods. In some embodiments, symbols module 358 is configured to generate random or pseudo-random sequences of available symbols or subsets thereof, to decrease the likelihood of a player being able to predict the next symbol in a sequence without actually viewing a depicted symbol.

In the embodiment shown, reporting module 362 is generally configured to interface with the one or more electronic storage devices to read and/or access data corresponding to various entities associated with the system (e.g., players, coaches or trainers, teams, sports). For example, reporting 362 may generate data indicative of a player's athletic performance, a coach's or trainer's effectiveness in improving or maintaining players' athletic performance, a team's average or aggregate athletic performance, and/or the improvement or maintenance of athletic performance achieved for a particular sports. For example, a player wishing to join a new football team may wish to generate a report of that player's historical performance on tackling drills indicative of the player's form when tackling.

In the embodiment shown, communications module 366 is generally configured to communicate with user interface devices 110 associated with various users.

EXAMPLES

Example 1. In one example of the present systems, display 14 is a relatively simple screen (e.g., a liquid crystal display) that is physically connected by a cable to a relatively simple controller 38. Specifically, the controller includes a physical keypad with a plurality of keys each corresponding to a different symbol (e.g., the numbers "0" through "9"). When a coach or player wishes to depict a symbol on the display (e.g., just before a player hits tackling dummy 22), the coach or player pushes one of the keys. The player then audibly tells the coach or trainer an identification of the symbol the player asserts to have been depicted, and the coach or trainer mentally compares the player's symbol identification with the symbol that was actually depicted. In this example, the order in which symbols are depicted is determined by the order in which the coach or trainer presses the keys. In this example, neither of the display or controller necessarily includes memory to store records associated with the player or player's performance.

Example 2. In another example of the present systems, display 14 is provided by an iPad or Android tablet computer, and controller 38 is provided by an iPad or iPhone, or Android smartphone or tablet computer. In this example, each of display 14 and controller 38 can download and run an application or "app" that configures the display 14 and controller 38 to communicate with each other to perform the various steps of the methods and processes described in this disclosure. In this example, the hardware of the smartphones and/or tablets are typically sufficient to implement all (or nearly any subset) of the functionality described in this disclosure. For example, an iPad or Android tablet computer typically includes an accelerometer that can be used to implement certain functionality of sensor 46 described above (e.g., permitting the display 14 to determine the moment at which a football player hits a tackling dummy). By way of further example, an iPad or Android tablet computer typically includes a rear-facing camera that can be used to implement certain functionality of sensor 46 described above (e.g., permitting the display 14 to determine the moment at which a player performs a particular type of movement or reaches a particular position). When the display determines such a moment, the display can also determine which symbol was depicted at or within a specified timeframe of that moment; for example, the display can cycle through a series of symbols to ensure that the player must be watching the display at the appointed time, and can determine the one of the symbols that was depicted at the time corresponding to the players action or interaction.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of training a player to maintain head position in a specific orientation during a sport, comprising:
   a) using a user input display to depict a first symbol on an electronic display physically coupled to a piece of athletic equipment at the time of an action on the piece of athletic equipment by the first player;
   b) obtaining an identification of the symbol from the first player after the first player has completed the action on the piece of athletic equipment with the player's head position maintained in the specific orientation; and
   c) receiving the first input associated from the first player corresponding to the first symbol,
   wherein the piece of athletic equipment is a tackling dummy,
   wherein the action is tackling the tackling dummy,
   wherein the electronic display depicts the first symbol based on a signal from a sensor, the signal associated with interaction between the first player and the tackling dummy,
   wherein the symbol is displayed less than one second prior to the action,
   wherein the electronic display is coupled to an upper half of the tackling dummy and, more specifically, is closer to an upper end of the dummy than to a vertical center of the tackling dummy, and
   wherein the maintaining a specific head position prevents injury of the player during the sport.

2. The method of claim 1, where the first symbol is a letter or a number.

3. The method of claim 2, further comprising:
   storing a record, associated with the first player, of whether the first input corresponds to the depicted first symbol.

4. The method of claim 1, where the hand-held device comprises a smartphone, remote control, or tablet wirelessly connected to the display, and the user input is transmitted wirelessly to the display.

5. The method of claim 1, further comprising:
   depicting a second symbol at the time of an action by a second player; and
   receiving from the second player a second input asserted to correspond to the depicted second symbol.

6. The method of claim 1, wherein said obtaining is audibly obtaining.

\* \* \* \* \*